United States Patent [19]
Secord

[11] Patent Number: 5,164,606
[45] Date of Patent: Nov. 17, 1992

[54] MATERIAL LEVEL SENSOR WITH REMOVABLE OPTICS

[75] Inventor: John R. Secord, Port Huron, Mich.

[73] Assignee: Bindicator Company, Port Huron, Mich.

[21] Appl. No.: 657,445

[22] Filed: Feb. 19, 1991

[51] Int. Cl.[5] .................................... G01F 23/02
[52] U.S. Cl. ...................... 250/577; 73/293
[58] Field of Search ............ 250/577, 574, 578.1; 340/619; 73/293

[56] References Cited

U.S. PATENT DOCUMENTS

| | | |
|---|---|---|
| 3,549,893 | 12/1970 | Gibbs . |
| 3,683,196 | 8/1972 | Obenhaus . |
| 3,766,395 | 10/1973 | Kelr . |
| 3,834,235 | 9/1974 | Bouton et al. . |
| 4,485,856 | 12/1984 | Dulian et al. . |
| 4,979,797 | 12/1990 | Nemeth ............... 250/577 |
| 5,029,471 | 7/1991 | Goodrich ............ 250/577 |

Primary Examiner—Janice A. Howell
Assistant Examiner—Richard Hanig
Attorney, Agent, or Firm—Barnes, Kisselle, Raisch, Choate, Whittemore & Hulbert

[57] ABSTRACT

A system for sensing the presence of or level of material within a vessel that includes a light transmitting probe extending into the vessel through a wall of the vessel from externally thereof. The probe has a lens with a closed end within the vessel for contact with the material sought to be detected, and a light source/sensor unit positioned externally of the vessel. The light source/sensor unit directs light energy through the lens of the probe to the closed end of the lens, which is within the vessel. The source/sensor unit detects the presence of material in contact with the closed end of the lens as a function of light energy reflected back to the source/sensor unit. The light source/sensor unit is removably mounted on the lens so that the source/sensor unit may be removed from the lens for service without removing the lens itself from the vessel wall.

14 Claims, 1 Drawing Sheet

MATERIAL LEVEL SENSOR WITH REMOVABLE OPTICS

FIELD OF THE INVENTION

This invention relates to a system for sensing the presence of material within a vessel, and in particular to a light transmitting probe with a removable light source/sensor unit to detect the presence of material within the vessel.

BACKGROUND OF THE INVENTION

A material sensing system is used with a vessel to sense the presence of or level of material in the vessel. The system includes a light source/sensor unit. The unit provides light that is directed into a light transmitting probe, one end of which is a sensing point of a lens. When a beam of light reaches the sensing point of the lens, it will either be reflected back to a sensor portion of the unit or transmitted into the surrounding medium. Typically, the beam of light will be reflected when the lens is surrounded by air, and will be transmitted if the lens is surrounded by a material, such as a liquid. When light is reflected back and received by the detector unit, an electrical signal is generated.

Typically, the probe is secured in a housing. In the prior art, the housing includes a case and adaptors that adapt the housing carrying the probe to a vessel. If it is desired to have access to the light source/sensor unit, the probe or other related parts within the housing that require maintenance, the housing must be removed from the vessel to release the probe. U.S. Pat. No. 3,834,235 shows a typical configuration in which a hole is left in the sidewall of the vessel when the source/sensor unit is removed.

What is needed is a probe constructed and arranged with a lens separable from the detector unit to permit the unit to be removed from the vessel without leaving a hole in the sidewall of the vessel. What is also needed is a lens portion of the probe which itself provides the necessary supporting structure to engage and support the light source/sensor unit.

SUMMARY OF THE INVENTION

The invention provides a system for sensing the presence of or level of material within a vessel that includes a light transmitting probe extending into the vessel through a wall of the vessel from externally thereof. The probe has a lens with a closed end within the vessel for contact with the material sought to be detected, and a light source/sensor unit positioned externally of the vessel. The light source/sensor unit directs light energy through the lens of the probe to the closed end of the lens, which is within the vessel. If material is present within the vessel, the source/sensor unit will detect the presence of the material in contact with the closed end by absence of light energy reflected from the closed end to the source/sensor unit.

The lens of the probe has a body that terminates at a closed end within the vessel, and securing means to secure the lens to the wall of the vessel. The securing means provides a seal so that the lens may extend through the vessel wall from externally of the vessel and be positioned with its closed end within the vessel. The lens is sealingly engaged to the vessel, and has an end external of the vessel with means thereon for removably mounting the light source/sensor unit on the lens.

The light source/sensor unit includes means for removably mounting the unit on the lens, so that the source/sensor unit may be removed from the lens for service without removing the lens itself from the vessel wall. The invention thereby maintains integrity of the vessel wall during service to the light source/sensor unit. In the preferred embodiments, the lens has an open end externally of the vessel with a bore that extends into the body of the lens. The source/sensor unit is received in the bore. Preferably, the source/sensor unit is secured within the bore by mating threads disposed respectively in the bore and on the unit.

The lens is transparent, and preferably in the shape of a shaft with a longitudinal axis, a closed end adapted to be mounted to the vessel by securing means and an open end with a bore external of the vessel that is adapted releasably to receive the light source/sensor unit. In one embodiment, the lens is secured to the wall of the vessel by threads on an exterior surface of the shaft that engage threads in an opening in the wall of the vessel. Preferably, the lens is of a material selected from the group of polysulfone, acrylic, Teflon TM, clear PVC, quartz and glass. Alternatively, the lens may be secured to the vessel by means of a joint, such as a weld joint. Preferably, the weld joint is of a material selected from the group consisting of Teflon TM, clear polyvinyl chloride, acrylics and clear polycarbonates.

DETAILED DESCRIPTION OF THE PREFERRED EMBODIMENTS

Figure 1:
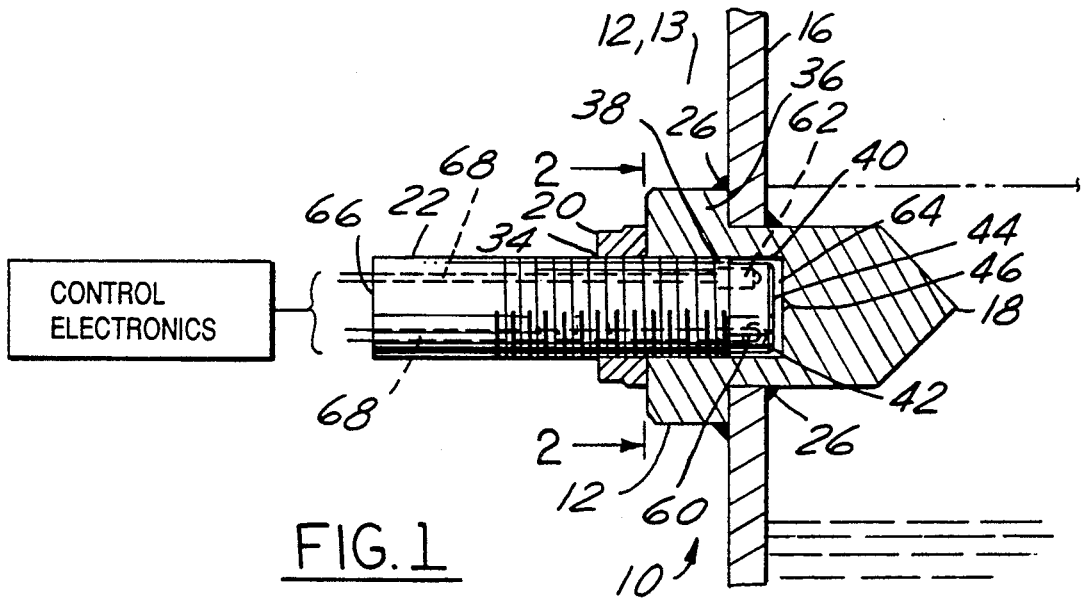
FIG. 1 is a fragmentary side view, partially in section, of an embodiment of the invention.
Figure 2:
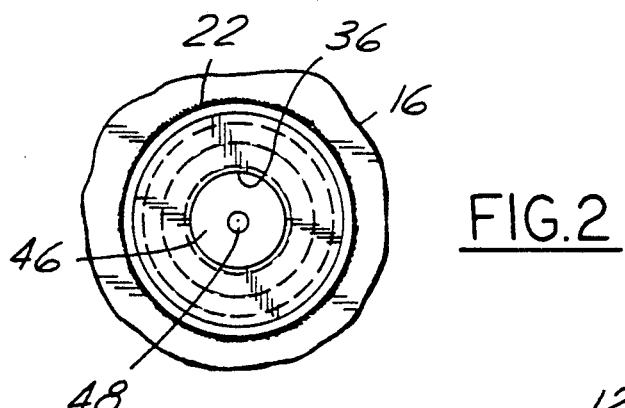
FIG. 2 is a view taken substantially along line 2—2 of FIG. 1 with light source/sensor unit 22 removed.

FIGS. 1 and 2 illustrate a material sensing system 10 that includes a probe 12 comprising a lens 13 having a body that extends into the interior of a vessel 14 through a wall 16 from externally thereof. Lens 13 has a closed end 18 within the vessel 14 and a distal end 20 external of the vessel 14. There is a light source/sensor unit 22 positioned externally of the vessel 14 for directing light energy through the lens 13 to the closed end 18 of the probe 12. The light source/sensor unit 22 detects the presence of material within the vessel 14 in contact with the closed end 18. If material is not present, light energy will be reflected by the closed end 18 and detected at the distal end 20 by the source/sensor unit 22. If material is present in the vessel 14, the light will be transmitted into the material surrounding the closed end 18, and therefore there will not be a reflection of light energy back to the source/sensor unit 22.

Figure 3:
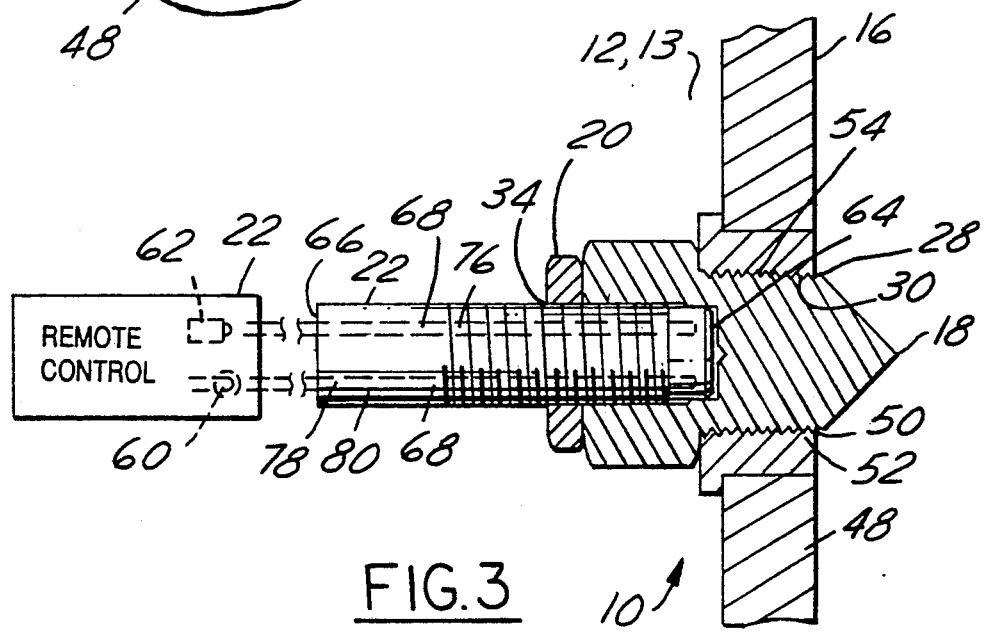
FIG. 3 is a fragmentary side view, partially in section, of an alternative embodiment of the invention.

The probe 12 includes securing means, such as a joint 26, which attaches lens 13 to the wall 16. As shown in FIG. 1, the joint 26 may be an adhesive joint or a weld joint. Preferably, there is a circumferential weld interior of the vessel 14 joining the interior of the wall 16 to the lens 13, and a circumferential weld exterior of the vessel 14 joining the exterior of the wall 16 to the lens 13. The weld joint 26 is preferably of a material selected from the group consisting of Teflon TM, clear polyvinyl chloride, acrylics and clear polycarbonates. Alternatively, as shown in FIG. 3, the lens 13 may be secured to the vessel 14 in a threaded gland 48 affixed to the wall 16. The lens 13 in this embodiment has external threads 30 engageable with the internally threaded opening 28 of gland 48.

The portion of the lens 13 external of the vessel 14 includes means for removably mounting the light source/sensor unit 22 on the lens 13 external of the vessel 14. Thus, the light source/sensor unit 22 may be removed from the lens 13 for service without removing the lens 13 from the vessel wall 16, thereby maintaining integrity of the vessel wall 16 during service to the light source/sensor unit 22. The distal end 20 of the lens 13 has a bore 34 forming an opening that extends into the body of the lens 13. The light source/sensor unit 22 is removably received within the bore 34. The bore 34 has internal threads 36, and the light source/sensor unit 22 has external threads 38 on one end 40 for removably securing the unit 22 to the lens 13. Preferably, the bore 34 has a wall 42, a base 44 and a central notch 46 in the base 44 spaced from the wall 42. The unit 22 is disposed within the bore 34 and spaced from the base 44. It has been found that the notch 46 inhibits direct reflection of light by surface 44 from light source 60 to light detector 62 within unit 22.

As shown in FIGS. 1, 2 and 3, the lens 13 is of a unitary light transparent construction. The lens 13 is preferably in the shape of a shaft with a longitudinal axis, a closed tapering end 18 adapted to be mounted to a supporting structure such as a vessel wall 16 by securing means. The lens 13 preferably has an open distal end 20 with a bore 34 that extends longitudinally into the lens 13 adapted to releasably receive the unit 22.

Preferably, the light source/sensor unit 22 comprises a body having a first end 64 adjacent the closed end 18 of the probe 12, a second end 66 external of the vessel 14, and a pair of channels 68 which extend adjacent from the first end 64 to and through the second end 66.

In one embodiment, one of the channels 68 carries the light source 60 of the light source/sensor unit 22 and the other channel 68 carries the detector 62 of the light source/sensor unit 22.

In another embodiment, a light transmitting structure 76 is disposed in each of the channels 68, to transmit light between the first and second ends 64, 66 of the light source/sensor unit 22.

Preferably, the light transmitting structure 76 comprises transparent light transmitting fibers 78 enclosed by a peripheral wall 80 having a lower index of refraction than the fibers 78. Such structures which have fibers of glass or plastic are known as optical fibers.

The invention provides a system for releasably mounting a light source/sensor unit 22 on a lens 13, whereby the light source/sensor unit 22 may be removed from the lens 13 without producing a hole in the vessel wall 16 through which the contents of the vessel 14 may spill. The invention also provides means for sealingly connecting the lens 13 to the wall 16 by means of permanent joints 26 such as weld joints, or by means of threaded joints 28, 30. Releasable threaded joints provide the advantage that the lens 13 may be removed and replaced, if required, when the level of material in the vessel 14 is below the level of the opening 28.

I claim:

1. A system for sensing level of material within a vessel that includes a light transmitting probe extending into the vessel through a wall of the vessel from externally thereof and having a closed end disposed within the vessel for contact with material, and light source/sensor unit positioned externally of the vessel for directing light energy through the probe to the closed end and detecting presence of material within the vessel in contact with the closed end as a function of light energy reflected by the closed end, the improvement wherein:

the probe comprises a lens having a body of unitary light transparent construction terminating at the closed end, means for securing the lens to the wall of the vessel such that the body extends through the vessel wall from externally thereof and positions the closed end within the vessel for contact with material in the vessel, and an internally threaded bore on the lens body opposite said closed end for removably mounting the light source/sensor unit on the lens externally of the vessel, and wherein the light source/sensor unit includes external threads on one end for removably mounting the source/sensor unit on the lens within said internally threaded bore, such that the source/sensor unit may be removed from the lens for service without removing the lens from the vessel wall thereby maintaining integrity of the vessel wall during service to the light source/sensor unit.

2. A system according to claim 1 wherein the bore has a base and a notch in the base positioned to be opposed to said light source/sensor unit so as to reduce direct reflections by said wall from and to said light source/sensor unit.

3. A system according to claim 1 wherein the securing means comprises an opening in the vessel and threads on an exterior surface of the lens engageable with threads in the opening.

4. A system according to claim 1 wherein the lens is of a material selected from the group consisting of polysulfone, acrylic, Teflon TM, clear PVC, quartz and glass.

5. A system according to claim 1 wherein the securing means comprises a joint that permanently attaches the lens body to the wall of the vessel.

6. A system according to claim 5 wherein the joint is a weld joint.

7. A system according to claim 6 wherein the weld joint is of a material selected from the group of Teflon TM, clear polyvinyl chloride, acrylics and clear polycarbonates.

8. A system according to claim 5 wherein the joint is an adhesive joint.

9. A system according to claim 1 wherein the light source/sensor unit comprises a body having a first end with said external threads adapted to be received in said bore, a second end external of the vessel, and a pair of channels that extend from adjacent the first end to and through the second end.

10. A system according to claim 9 wherein one of the channels carries a light source and the other channel carries a light detector.

11. A system according to claim 9 comprising a light transmitting structure disposed in each one of the channels.

12. A system according to claim 11 wherein the light transmitting structure comprises transparent light transmitting fibers enclosed by a peripheral wall having lower index of refraction than the fibers.

13. A system according to claim 12 wherein the light transmitting structure is a fiber optic cable.

14. A system according to claim 1 wherein the securing means comprises an opening in the vessel wall, a gland permanently secured to the vessel wall with an internally threaded bore extending through the opening and external threads in the lens body for mounting the lens in the gland.

* * * * *